(12) United States Patent
Cheng et al.

(10) Patent No.: US 10,744,468 B2
(45) Date of Patent: Aug. 18, 2020

(54) SYSTEM AND METHOD FOR FEEDING GAS INTO LIQUID

(71) Applicants: Alan T Cheng, Naperville, IL (US); Yeu-Chuan Simon Ho, Naperville, IL (US); Balazs Hunek, Western Springs, IL (US)

(72) Inventors: Alan T Cheng, Naperville, IL (US); Yeu-Chuan Simon Ho, Naperville, IL (US); Balazs Hunek, Western Springs, IL (US)

(73) Assignee: Praxair Technology, Inc., Danbury, CT (US)

(*) Notice: Subject to any disclaimer, the term of this patent is extended or adjusted under 35 U.S.C. 154(b) by 191 days.

(21) Appl. No.: 15/678,465

(22) Filed: Aug. 16, 2017

(65) Prior Publication Data

US 2018/0050312 A1    Feb. 22, 2018

Related U.S. Application Data

(60) Provisional application No. 62/376,640, filed on Aug. 18, 2016.

(51) Int. Cl.
| | | |
|---|---|---|
| *B01F 5/04* | (2006.01) | |
| *B01F 3/04* | (2006.01) | |
| *B01F 13/10* | (2006.01) | |
| *A01K 63/04* | (2006.01) | |
| *A01K 61/10* | (2017.01) | |

(52) U.S. Cl.
CPC ........ *B01F 3/04262* (2013.01); *A01K 63/042* (2013.01); *B01F 3/04099* (2013.01); *B01F 3/04985* (2013.01); *B01F 5/0476* (2013.01); *B01F 13/1022* (2013.01); *A01K 61/10* (2017.01); *B01F 2003/049* (2013.01); *B01F 2003/0439* (2013.01); *B01F 2003/04319* (2013.01); *B01F 2003/04879* (2013.01); *B01F 2215/0052* (2013.01)

(58) Field of Classification Search
CPC ............................ B01F 5/0476; A01K 63/042
USPC .......................................................... 261/94
See application file for complete search history.

(56) References Cited

U.S. PATENT DOCUMENTS

| | | | |
|---|---|---|---|
| 4,743,405 A | 5/1988 | Durao et al. | |
| 4,992,216 A | 2/1991 | Saita et al. | |
| 5,151,187 A | 9/1992 | Behmann | |
| 5,316,682 A | 5/1994 | Keyser et al. | |
| 5,451,104 A * | 9/1995 | Kleen ................. | B01F 3/04446 366/101 |
| 5,492,404 A | 2/1996 | Smith | |
| 5,935,490 A | 8/1999 | Archbold et al. | |
| 7,533,874 B2 | 5/2009 | Glomset | |
| 7,806,584 B2 | 10/2010 | Wootan et al. | |
| 8,556,236 B2 | 10/2013 | Glomset et al. | |
| 8,678,354 B2 | 3/2014 | Kerfoot | |
| 8,733,742 B2 | 5/2014 | Sabadicci et al. | |
| 2004/0107836 A1 | 6/2004 | Yi | |
| 2010/0154717 A1 | 6/2010 | Glomset et al. | |
| 2013/0126004 A1 | 5/2013 | Wu et al. | |
| 2013/0139688 A1 | 6/2013 | Schneeberger et al. | |
| 2014/0051774 A1 | 2/2014 | Shimoda | |
| 2014/0305509 A1 | 10/2014 | Wu et al. | |

* cited by examiner

*Primary Examiner* — David L Sorkin
(74) *Attorney, Agent, or Firm* — Donald T. Black

(57) ABSTRACT

Disclosed are a system and a method for dissolving water-soluble gas such as oxygen into water, employing microporous membrane.

11 Claims, 5 Drawing Sheets

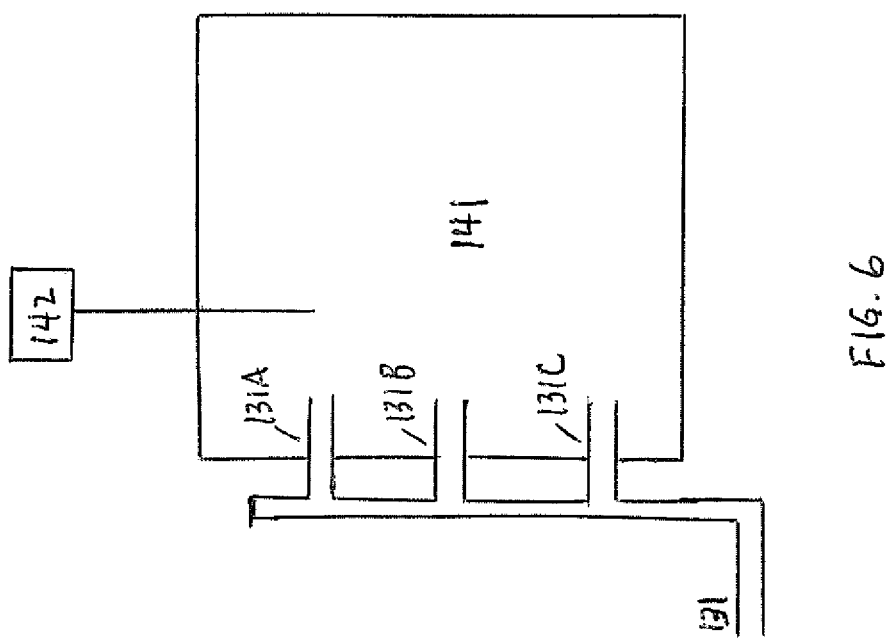

US 10,744,468 B2

SYSTEM AND METHOD FOR FEEDING GAS INTO LIQUID

RELATED APPLICATIONS

This application claims the benefit of U.S. Provisional Application Ser. No. 62/376,640, filed on Aug. 18, 2016, which is incorporated herein by reference.

FIELD OF THE INVENTION

The present invention relates to feeding gas into liquid, typically carried out to promote dissolution into the liquid of the gas or of one or more components of the gas. An example of an application in which the present invention is useful is the oxygenation of fresh water or sea water to produce oxygenated water that is passed to tanks or holding pens to sustain or grow live fish which are present in the tanks or pens.

BACKGROUND OF THE INVENTION

In many commercial applications, it is desirable to promote the dissolution of gas into liquid. Examples of such applications include fish farming, beverage manufacture, and wastewater treatment. In general, one technique for promoting dissolution of gas into liquid involves sparging the gas in the liquid, that is, passing the gas through a device that emits the gas in small bubbles into the liquid. Some techniques employ venturi-type devices wherein the liquid is impelled through a device having a converging-diverging cross-section to increase the liquid velocity and turbulence intensity, wherein the gas stream is fed into the liquid as it passes through the device.

Surface tension between the gas and liquid can inhibit the injected gas stream from dispersing into bubbles. Energy in the form of kinetic energy, potential energy or turbulent mixing must be applied to the gas and/or liquid stream to overcome surface tension and disperse the gas stream or large bubbles into smaller bubbles. While large bubbles are easy to break, the surface area to volume ratio is in an inverse relationship with the bubble radius. Increasing energy intensity is required to overcome surface tension of the larger bubbles to form finer bubbles. Therefore, these conventional techniques require significant energy and turbulent intensity to generate finer gas bubbles.

The known techniques encounter pressure drops and other operational constraints that require high energy input, without necessarily producing satisfactory results. The present invention provides improved results in dissolution while requiring much less energy.

BRIEF SUMMARY OF THE INVENTION

In one aspect, the present invention comprises a device useful for feeding water-soluble gas into aqueous liquid, comprising
  a conduit having an inlet, an outlet, and a throat section sealed to the downstream end of the inlet and to the upstream end of the outlet, the throat section defining a flow passage through which liquid can flow from the inlet to the outlet,
  wherein a portion or all of the inner surface of the throat section comprises a smooth microporous discharge face of a solid membrane through which gas can pass from the interior of the membrane out of the membrane into the flow passage in the throat section, the membrane also having an exterior face through which gas can be passed into the membrane from outside the throat section without the gas being able to enter the throat section other than through the discharge face,
  the device further comprising an outer housing that defines a chamber surrounding the exterior face of the membrane, and at least one port in the outer housing through which gas can be passed into the chamber,
  wherein gas can be passed into the flow passage in the throat section only through the membrane.

In one preferred embodiment of the device, all of the wall of the throat section is comprised of said microporous discharge face of said membrane.

In another preferred embodiment, the conduit also has an inlet section whose cross-sectional area converges in the direction toward the throat section, and also has an outlet section whose cross-sectional area diverges in the direction away from the throat section. It is preferred that the transition from the convergent section of the inlet section to the membrane feed face, and the transition from the throat section to the diverging discharge section, are smooth without steps or sharp edges, thereby to minimize pressure drop due to generation of turbulence and eddies.

In another aspect, the present invention comprises (a) feeding the aqueous liquid into the inlet of a conduit that has an inlet, an outlet, and a throat section that defines a flow passage between the inlet and the outlet through which the liquid flows from the inlet to the outlet;
  wherein the inner surface of the throat section comprises a smooth microporous discharge face of a solid microporous membrane through which gas can pass from the interior of the membrane out of the membrane into the throat section, wherein the discharge face is comprised of pores at least 95% less than 200 microns in diameter;
  wherein the liquid is fed into the inlet at a flow rate such that the velocity $V_{SW}$ of the liquid at the discharge face of the membrane is determined by the equation $$V_{sw} = \sqrt{\frac{N \cdot \sigma}{\rho \cdot d}}$$

in which $V_{SW}$ is the velocity of the liquid at the discharge face, N is a dimensionless number from 1 to 1,000, $\rho$ is the density of the liquid in $Kg/m^3$, $\sigma$ is the surface tension of the liquid in Newton/m, and d is 20 micron to 5,000 micron; and
  (b) feeding water-soluble gas into and through the membrane and out of the microporous discharge face of the membrane in the throat section into the liquid flowing through the throat section, at a gas pressure high enough to cause the gas to pass into and through the membrane into the liquid, wherein the gas that passes into the liquid forms bubbles at the membrane surface, the flowing liquid sweeps the bubbles off of the membrane surface, and the gas dissolves into the liquid.

Other aspects of the present invention comprise methods for feeding a water-soluble gas into an aqueous liquid, comprising
  (a) feeding the aqueous liquid into the inlet of a conduit that has an inlet, an outlet, and a throat section that defines a flow passage between the inlet and the outlet through which the liquid flows from the inlet to the outlet;
  wherein the inner surface of the throat section comprises a smooth microporous discharge face of a solid microporous membrane through which gas can pass from the interior of the membrane out of the membrane into the throat section; and (b) feeding water-soluble gas into and through the membrane and out of the microporous discharge face of the membrane in the throat section into the liquid flowing through the throat section, at a gas pressure high enough to cause the gas to pass into and through the membrane into the liquid, wherein the gas that passes into the liquid forms bubbles at the membrane surface, the flowing liquid sweeps the bubbles off of the membrane surface, and the gas dissolves into the liquid; and (c) the pressure drop between the entrance to the inlet section and the exit from the outlet section with gas injection is either (c)(1) less than the pressure drop through the same length of a straight pipe without gas injection, or (c)(2) less than the pressure drop through the same throat without gas injection.

Preferably, the conditions of the liquid mass flow rate relative to the gas feeding rate, and of the liquid velocity through the throat section as effected by the length of the throat section (and by the dimensions of the convergence and divergence, if present) are effective to dissolve into the aqueous liquid water-soluble gas fed through the membrane while realizing an overall pressure drop between the entrance to the inlet and the exit from the section of less than 30%, preferably less than 10%, and more preferably less than 1%, of the inlet pressure.

BRIEF DESCRIPTION OF THE DRAWINGS

FIG. 6 is a portion of a flowsheet showing another embodiment of the system of FIGS. 4 and 5 that incorporate a device according to the present invention.

DETAILED DESCRIPTION OF THE INVENTION

Figure 1:
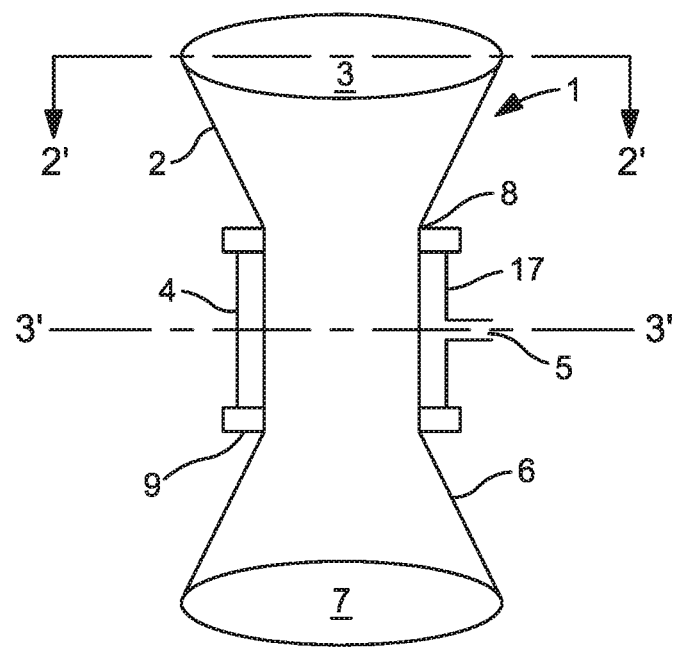
FIG. 1 is a perspective view of a device according to the invention.
Figure 2:
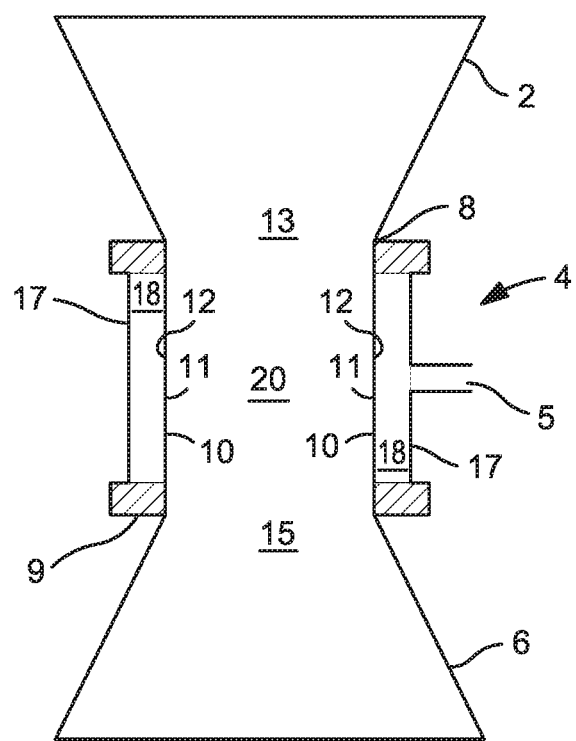
FIG. 2 is a cross-sectional view of the device of FIG. 1 taken on the plane indicated as 2'-2' in FIG. 1.

Turning first to FIGS. 1 and 2, which show the device of FIG. 1 in vertical cross-section through the center of device 1, device 1 is shown which can be characterized as a conduit, through which liquid can flow. Throat section 4 is between inlet 13 and outlet 15.

The conduit may include inlet section 2 and outlet section 6, that extend upstream and downstream respectively from throat section 4. Any such inlet section and outlet section should present a converging-diverging configuration as illustrated in FIGS. 1 and 2 and as discussed further below. (The inlet and outlet sections may have the same diameter as throat section 4, but this is generally less advantageous.) Throat section 4 is sealed to the downstream end 8 of inlet section 2 (if present) and to the upstream end 9 of outlet section 6 (if present). The respective sections 2 and 6 can be "sealed" to throat section 4 in any manner that confines liquid within device 1 against passing out of device 1 between sections 2 and 4 or between sections 4 and 6. For instance, the respective adjoining sections can be welded together, or they can be manufactured separately and then bolted together for instance at mating flanges between which one may choose to insert a gasket to aid in preventing passage of liquid out of device 1 between the ends of the sections.

Housing 17 and port 5 that appear in FIG. 1 are described more fully below.

Figure 3:
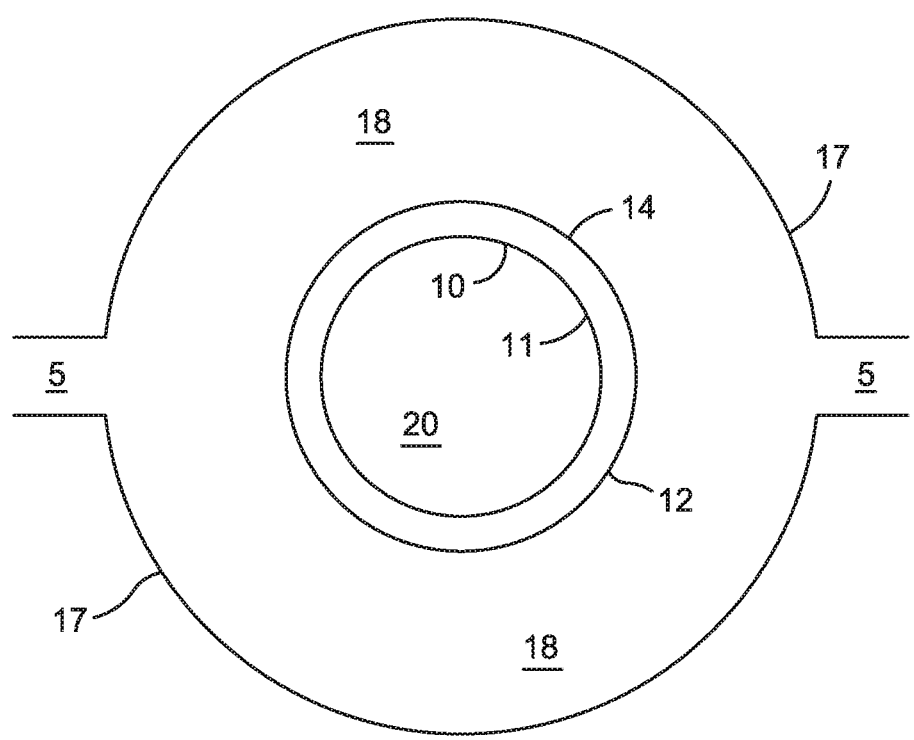
FIG. 3 is a cross-sectional view of the device of FIG. 1 taken on the plane indicated as 3'-3' in FIG. 1.

Reference is now made to FIG. 3, which shows the device of FIG. 1 in horizontal cross-section through throat section 4 in the plane wherein port 5 is located.

Wall 10 is located inside throat section 4. Wall 10 extends all the way around, and defines, flow passage 20 which is open all the way through throat section 4 from inlet 13 to outlet 15. Where inlet section 2 and outlet section 6 are present, inlet 13 is open to inlet section 2, and outlet 15 is open to outlet section 6, and wall 10 is sealed to sections 2 and 6 so that liquid entering inlet section 2 is confined to flow into and through flow passage 20 and from flow passage 20 into and through outlet section 6, without liquid entering chamber 18, when the chamber is filled with pressurized gas. Wall 10 separates flow passage 20 from chamber 18 in throat section 4, throughout the entire extent of wall 10.

The device, not including the membrane 14 described below, is preferably manufactured of organic polymeric material such as polyethylene or polyvinyl chloride.

In a preferred embodiment of the invention, the cross-sectional area of inlet section 2 converges in the direction heading from opening 3 toward throat section 4, and the cross-sectional area of outlet section 6 diverges in the direction heading away from throat section 4 toward opening 7. In this embodiment, the convergent inlet section 2 preferably forms a smooth transition with wall 10 without steps or sharp edges. This is important in minimizing turbulent mixing which causes pressure drop, as when liquid accelerates to higher velocity through the convergent section 2, liquid hitting any sharp corners or step will change directions, creating turbulence, eddies or even vortexes. The same applies to the junction between the divergent outlet section 6 and wall 10. Any portion of wall 10 that is not entirely comprised of microporous membrane (as described herein) should be smooth and should transition smoothly with the discharge surface 11 of the membrane without seams, edges or other protrusions, so as to minimize turbulence leading to pressure drops.

At least a portion, preferably substantially or all, of wall 10 is the microporous surface of a solid microporous membrane 14 described herein which includes discharge face 11 and exterior face 12. Discharge face 11 faces flow passage 20. Exterior face 12 faces the interior of chamber 18 that is defined by housing 17. Housing 17 preferably surrounds chamber 18 so that chamber 18 is sealed to the membrane 14 so that gas can enter chamber 18 only through one or more ports 5 and so that gas can exit chamber 18 only through exterior face 12 into and through the membrane 14 and out through discharge face 11.

Port 5 (or multiple ports 5) each through a wall of chamber 18 of throat section 4 permits gas to pass from a source outside of device 1 into chamber 18. Gas such as oxygen to be fed into liquid in throat section 4 is provided under pressure through a gas feed line or tube attached to port 5. Chamber 18 preferably extends in contact with exterior face 12 of the membrane 14 all the way around throat section 4, as shown in FIG. 3. In contrast to previous practice that uses multiple ports and/or nozzles to make multiple injection points for the gas into the liquid, it is not necessary in this invention to have multiple discrete ports or injection points, as the entire membrane surface serves as the microporous gas transfer surface.

All, or at least a substantial portion (at least 75%), of wall 10 defining the flow passage 20 is comprised of a microporous discharge surface 11 of microporous membrane 14. Gas flows from chamber 18 through the microporous membrane into flow passage 20, as described herein. Preferably, wall 10 is comprised entirely of discharge surface 11 of microporous membrane 14. Also preferably, the chamber 18 which is in fluid communication with port 5 is also entirely in contact with the exterior face 12 of such membrane all the way around the 360 degrees of throat section 4. In this way, gas flow is enabled from the full 360 degrees of circumference of wall 10 through the discharge face of the membrane 14 into flow passage 20. FIG. 3 illustrates this embodiment of the invention.

The microporous membrane 14 serves several purposes. One purpose is to create micron size bubbles without reliance on shear from turbulent mixing of gas injected into liquid in flow passage 20. Another purpose is to interrupt the boundary layer of the flowing liquid so that viscous drag on the surface of the wall 10 and on the surface of discharge face 11 can be reduced. Both phenomena reduce the pressure drop of the two-phase flow through and out of throat section 4.

The membrane 14 is a unitary solid and is microporous, by which is meant that it has many narrow passages passing all the way through it from exterior face 12 through to discharge face 11 so that gas under pressure in chamber 18 can flow through the membrane, entering at face 12 and exiting at face 11, whereby the gas can contact the liquid in flow passage 20. Membrane 14 is preferably rigid but can instead be flexible.

At least 95% of the pores in the discharge surface 11 of membrane 14 should be 200 microns or smaller in diameter. Preferably at least 95% of the pores in the discharge surface 11 should be 50 microns or smaller, and more preferably 5 microns or smaller, in diameter. The membrane, in addition to having pores of the right diameter, should also have many pores to allow sufficient gas flow to pass through for practical applications. This feature is embodied and expressed in the porosity of the membrane, which is the pore volume per total membrane volume (in which the total membrane volume is comprised of the pore volume plus the volume of the membrane material). The preferred porosity of membranes used in this invention is higher than 25%. The membrane will thus have millions of pores per square meter of membrane, making it useful for this invention by providing high gas flux.

Membranes suitable for use in this invention can be made of metal (such as steel), or ceramic material, or organic polymeric material (such as polyethylene). Membranes suitable for use in this invention can be manufactured and obtained commercially. One general technique for manufacturing metallic membranes suitable for use in this invention is by powder metallurgical operations, wherein a mass of powder of a suitable metal or of a suitable precursor compound of a suitable metal, having a desired particle size range, is formed into the desired shape (typically the shape of a cylinder, sheet or disc), optionally with a binder to help the mass retain its desired shape, and the mass is sintered under pressure by compression in a mold (that is, heated so that the particles of powder coalesce without completely melting and any binder volatilizes out of the mass). Uniformity of the metallic particles and proper compression in a mold under pressure ensures that the powder is closely packed to form pore structures. In this invention, very large cylinders are needed to make the entire wall with shape, diameter and length dictated by individual dissolution and flow rate requirements. These type of cylinders must be custom built with individual molds for compression and sintering, and would make implementation prohibitively expensive. Therefore, this invention uses flat sheets of membrane (preferably metallic) that are two-dimensionally compressed and sintered. The sheet is cut to size and machine rolled and welded to form the proper cylinder for the construction of these walls.

Preferred thickness dimensions for the membrane are 0.0156 inches to 0.5 inches. Thicker membranes provide structural stability while thinner membranes allow higher flux of gas to pass through at a given supply pressure. The membrane can be made of more than one layer with differences in material of construction, pore size, hydrophilicity or strength. The property of the layer that is in contact with the water is the most important one that dictates the size of the oxygen bubble formation.

Figure 4:
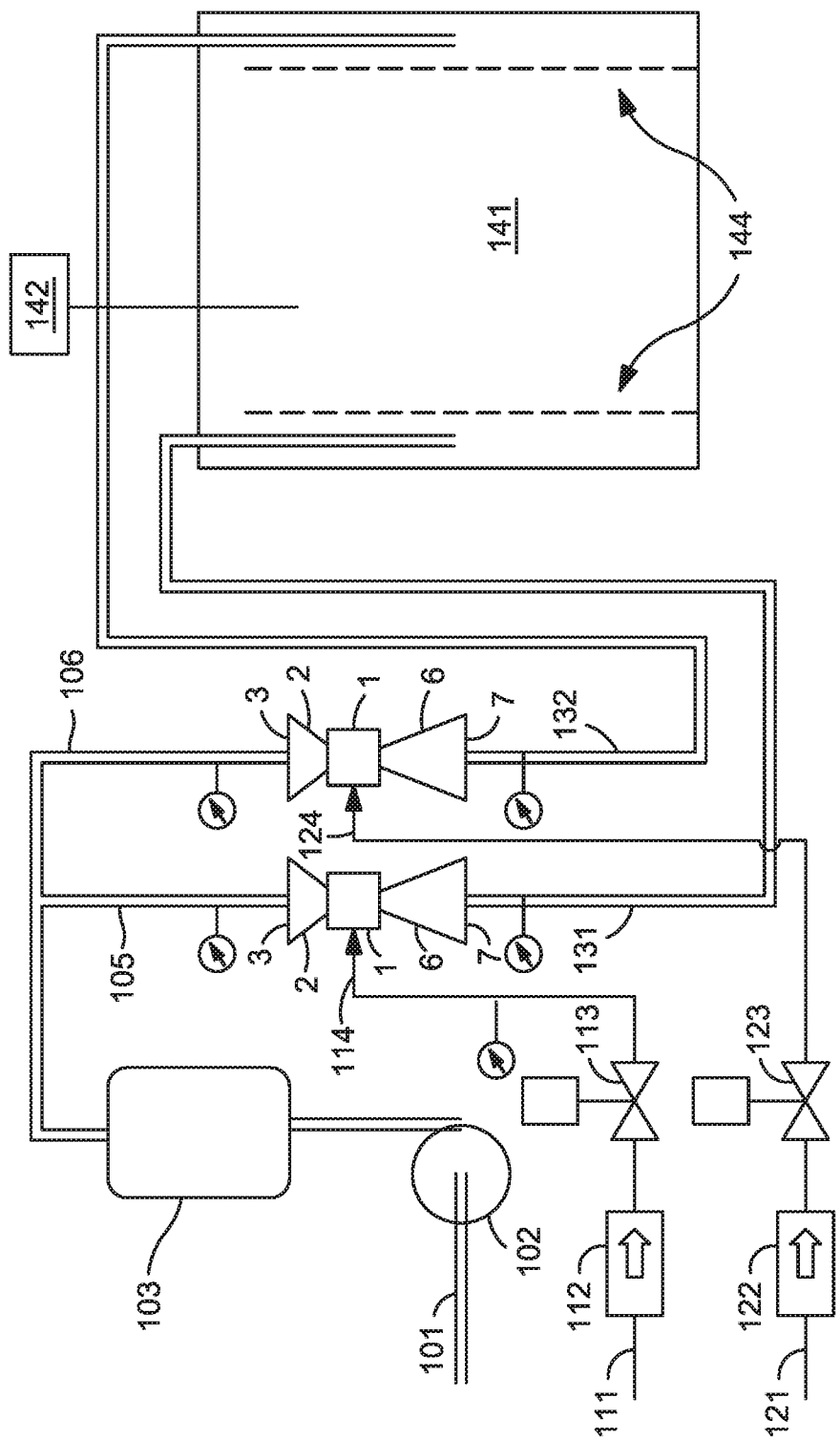
FIG. 4 is a flowsheet showing a system that incorporates a device according to the present invention.

Turning to FIG. 4, there is illustrated a system which usefully employs the system described above. FIG. 4 illustrates an operation that provides oxygenated water into a tank 141 that can hold fish. Understandably, respiration by fish in the tank would gradually deplete the amount of dissolved oxygen present in the water in the tank, so it is necessary to replenish the dissolved oxygen in the water in the tank on a periodic or (preferably) continuous basis.

As shown in FIG. 4, water (fresh water or sea water, depending on what the fish is) is fed via line 101 through pump 102 through optional chiller 103 into line 105 which feeds the water into feed opening of a device 1 such as is described herein. Oxygen of a desired oxygen content is fed through line 111 and flowmeter 112 and valve 113 to line 114 which feeds the oxygen into device 1 through opening 5 (or, as described above, optional feed tube 9). Oxygenated water, having a desired oxygen content as produced by device 1, passes through discharge opening into line 131 which conveys the oxygenated water into tank 141. Tank 141 optionally but preferably contains distributor 144 such as a screen through which water can pass but which prevents fish from passing through it, to promote uniform distribution of freshly oxygenated water within the tank 141. Alternatively, as shown in FIG. 6, line 131 can end in one to ten branches (such as 131A, 131B and 131C) which feed oxygenated water at different levels into tank 141. Optional dissolved oxygen meter 142 can measure the dissolved oxygen content of the water in tank 141, to indicate to the operator whether the dissolved oxygen content is suitable and when additions of oxygenated water are necessary.

It is optional to employ a second device 1, to oxygenate water that is fed by line 106, in parallel with the device that is fed by line 105. In such situations, oxygen fed in line 121 through flowmeter 122 and valve 123 is fed into the device 1 which is fed water via line 106. The resulting oxygenated water 132 that is produced in this second device 1 is fed through line 132 into tank 141.

Optionally, but preferably, water may be drawn out of the tank 141 and fed back into line 101 to be re-oxygenated.

In the embodiment shown in FIG. 4, the velocity of the water passing through the device or devices 1 is imparted by the pump or pumps 102.

Figure 5:
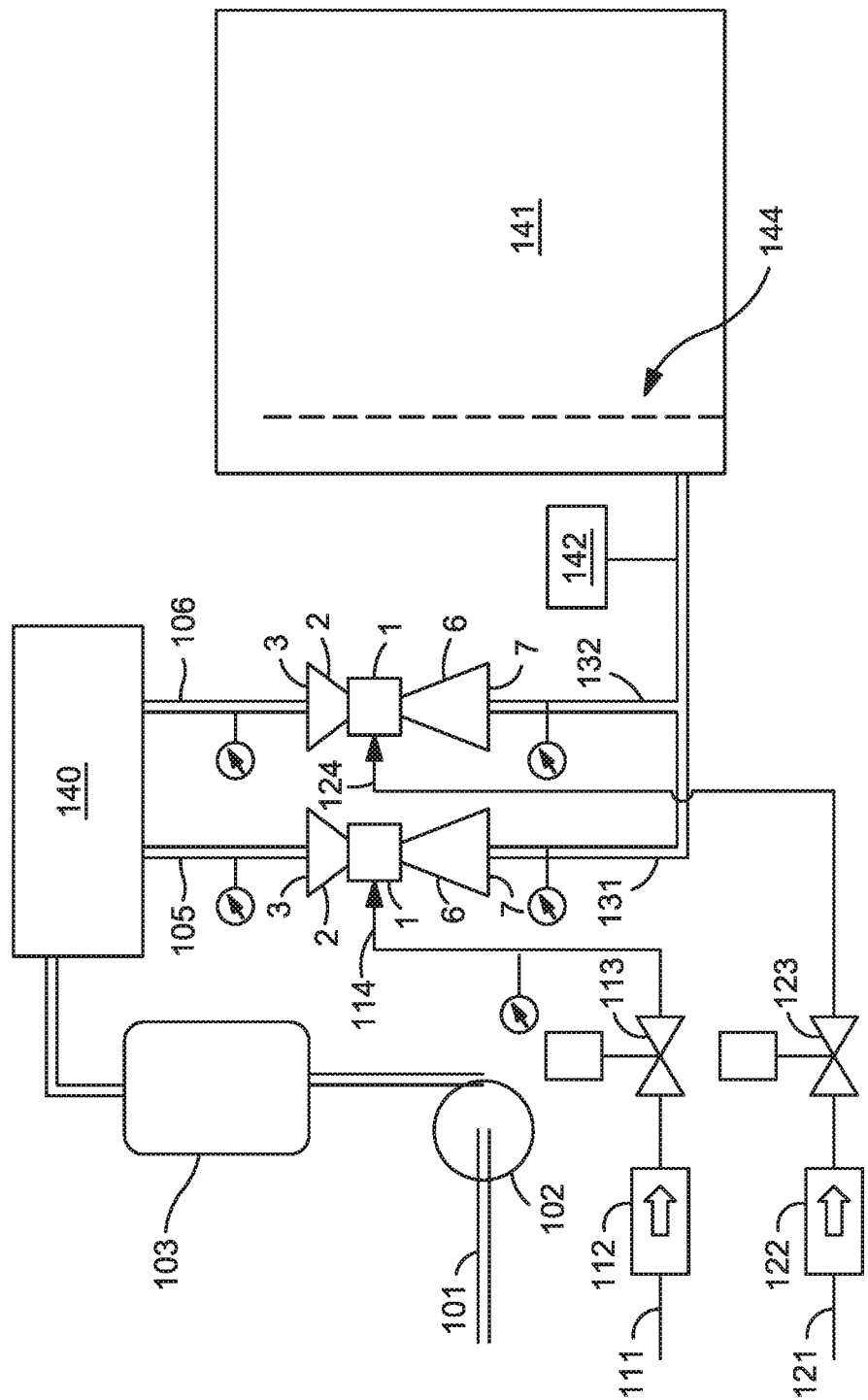
FIG. 5 is a flowsheet showing another embodiment that incorporates a device according to the present invention.

It is also possible to impart velocity to the water by supplying the water to a holding tank, as is illustrated in FIG. 5 in which water is fed by pump 102 into tank 140 and the water passes from tank 140 into lines 105 and 106 and then into device or devices 1, as described above with respect to FIG. 4. The water that emerges from device or devices 1 in lines 131 and 132 is fed into tank 141.

Large gas bubbles have significant buoyance force leading them to rise, even in liquid flowing in a direction opposite to the direction in which the bubbles would be rising. Turbulence, coalescence and excessive pressure are created by the two opposite forces of bubble buoyance and liquid flow. Therefore, it is undesirable to have an oxygenating device pointing downwards. In the case of the present invention, however, the micron size bubbles have too little buoyance force to flow against the water current. Therefore coalescence of the micron size bubbles does not increase with the downward flow of the liquid. On the other hand, the present invention can take advantage of the downward flow of the liquid for the micron size bubbles to reduce in size further due to the increase in hydrostatic head at lower elevation. Therefore, the dissolution rate of the gas into the liquid is further accelerated.

While the invention is described herein with reference to dissolution of oxygen, it should be recognized that the invention can be practiced with other water-soluble gases. In addition, reference to dissolution of a water-soluble gas such as oxygen is not limited to feeding a gas stream 100% of which is the desired gas that is to be dissolved into the water. In the case of oxygen, the gas that is fed can be air or can have an oxygen content from that of air, up to 100 vol. % oxygen. Preferred feed gas would contain at least 80 vol. % of the gas to be dissolved (that is, at least 80 vol. % oxygen), more preferably at least 85 vol. % of the gas to be dissolved, and more preferably at least 90 vol. % of the gas to be dissolved.

Operation

The rate of gases to be injected into a given flowing liquid stream will dictate the design and selection of the device as well as the design of the membrane and the surface area of the membrane surface 11 through which gas passes into the liquid, with the desired outcome of micron size gas bubbles and low pressure drop and low energy input. However, selecting very small pore size membranes does not by itself translate directly into micron size gas bubbles. This is a misconception that pore size will dictate the size of gas bubble being generated. That is because bubbles emerging from the exit of the small membrane pores will be held back by the surface tension between the gas bubbles and the membrane surface. The smaller the gas bubbles, the higher the surface area to volume ratio are for the bubbles. Another misconception is to believe that turbulent flow will immediately remove the micron size bubbles. Liquid flowing near a solid surface will have a much slower moving viscous flow boundary layer that has typical thickness of 2 mm, limiting the fast flowing fluid to remove only gas bubbles that are substantially larger than the boundary layer thickness.

Without disengaging from the surface of the membrane, the micron size gas bubbles will continue to grow in size until the bubbles are large enough (about 5-10 mm in diameter) so that buoyance force and turbulent flow can overcome the surface tension to remove the gas bubbles from the membrane surface.

The present invention has discovered how one can overcome the negative impact of bubble growth and coalescence on the surface of the membrane. First, the flow of oxygen gas through the membrane surface should be perpendicular to the flow of liquid. Liquid has mass several hundred times higher than the gas being injected. If the velocity of the liquid is high enough, the momentum (mass multiplied by velocity) of the liquid stream will have sufficient energy to overcome the surface tension that is holding the bubbles to the membrane surface. However, such shear force or momentum from the perpendicular flow cannot reach the surface in reality, due to the boundary layer phenomena that liquid near a wall flows at a much slower velocity than the main body of the liquid in the pipe due to the viscous drag of the liquid. Furthermore, the micron size gas bubbles that emerge at the membrane surface but are confined within the boundary layer will continue to grow in volume as more incoming gas will add to the size of the bubbles. Fast gas injection will ordinarily tend to grow larger bubbles as more gas will enter the bubbles before the forces can come into equilibrium.

Those larger bubbles will eventually break free from the membrane wall when the bubble diameters (typically 2-4 mm) are substantially larger than boundary layer thickness. The liquid flowing outside of the boundary layer provides the energy for the bubbles to break the surface tension. Smaller bubbles are desirable but are more difficult to break free from the membrane without external force.

To overcome the limiting factor from the slower flow at the surface due to the viscous boundary layer, this invention utilizing the membrane with micron size pores to generate millions of micron sizes bubbles on the surface, much smaller than the viscous boundary layer. Millions of micron size bubbles emerging on the membrane surface, however, are capable to disrupt this boundary layer by reducing its apparent density and viscosity, and serving as a lubricant. There, the velocity at the membrane surface will no longer be zero and the boundary starts to slip forward. This results in domino effects that the velocity in the boundary layer will continuous to increase to that the bulk of the liquid flow. Now micron size bubbles can be generated far below the typically 2-4 mm bubbles sizes with this invention by utilizing the micron size high flux membrane and unidirectional kinetic energy of sweeping liquid to disengage the micron size gas bubbles emerging from the membrane surface, before the diameter of the bubbles exceeds 2 millimeters (mm), preferably before the diameter of the bubbles exceeds 1 mm and more preferably before the diameter of the bubbles exceeds 0.1 mm. The preferred range is diameters of 0.5 to 1000 microns. Laminar or unidirectional liquid flow means liquid flow oriented only in one direction and perpendicular to the path of the gas emerging from the membrane surface. The absence of multi-directional turbulence, flow, recirculations or formation of eddies, are most desirable. The slip of the viscous boundary layer by the micron size bubbles are also the main reason that the pressure drop is much lower than expected even with the liquid acceleration and the two phase flow. Therefore, the diameter of the membrane pores must be smaller than the typical boundary layer thickness of 2 mm and preferably less than 200 micron.

Not all liquid flow in a given flow passage 20 will have velocity high enough to properly sweep gas as micron size bubbles emerging from the membrane surface. Therefore, this invention can be practiced including the converging inlet section 2 and the diverging outlet section 6 that are described herein with reference to FIGS. 1 and 2. Proper cylinder diameters of flow passage 20 is chosen based on the available liquid flow and the pipe diameter. To accelerate the liquid to the proper sweeping velocity, the converging inlet section 2 and the diverging outlet section 6 can be used to connect the pipe to the reduced diameter flow passage 20, not to generate turbulent mixing but to accelerate the flow rate of the liquid and while minimizing and recovering pressure drop between the inlet and the outlet. If the liquid is already flowing at a satisfactory sweeping velocity, the flow passage 20 could be the same diameter as the main liquid pipe feeding the device 1, and no acceleration and deceleration of the liquid with the compression and expansion sections are necessary. This is not common or practical because transporting water at satisfactory sweeping velocity for long distance will generate substantial pressure drop that is unrecoverable and excessive pumping power.

The minimum sweeping velocity can be determined by calculating from the aerodynamic force ($F_A$) (or in other words the fluid's inertia) necessary to remove the bubble from the membrane surface, and the cohesion force ($F_C$) that holds the bubble on the surface due to the surface tension. The ratio between the two forces i.e. inertial forces to surface tension forces can be represented as a function of the Modified Weber number ($N_{We}$) and the Bubble Drag Coefficient ($C_B$):

$$\frac{F_A}{F_C} = N_{We} \frac{C_B}{8}$$

Where
$F_A$=Aerodynamic force, in Newtons
$F_C$=Cohesion (surface tension) force, in Newtons
$N_{We}$=Modified Weber number, dimensionless
$C_B$=Bubble Drag Coefficient, based on the bubble geometry Expanding and rearranging the equation will obtain the equation for the sweeping velocity:

$$V_{Sw} = \sqrt{\frac{N \cdot \sigma}{\rho \cdot d}}$$

Where
$V_{Sw}$=Sweeping velocity, meter/sec
N=a dimensionless number that is related to the Modified Weber number and is from 1 to 1,000, preferably 3 to 700, more preferably 5 to 500
d=a factor that is related to the bubbles that are formed, and that is expressed in units of microns and is 20 to 5,000 microns, preferably 20 to 100 microns, and more preferably 20 to 100 microns
$\rho$=Density of the liquid, Kg/m³
$\sigma$=Surface tension of the liquid, Newtons (force)/m The sweeping velocity dictates the diameter of the membrane for a given range of liquid mass flow rate. The total surface area for the discharge face membrane is dictated by two factors. The first factor is the amount of oxygen (or other desired gas) required to be dissolved into the liquid, and the second factor is the superficial gas exit velocity. Since the conditions for both factors must be satisfied simultaneously, the factor that requires the highest membrane surface area or length will be the controlling factor.

First, the total surface area of the membrane must be sufficient (calculated from the length and diameter) to supply the amount of oxygen needed. Flux is the amount of oxygen that can flow through per unit surface area and is a function of the total amount of small pores that is present in the membrane. For a given pore size and pore size distribution specified by the manufacturer for a given membrane, the flux curve still has to be generated at various differential pressures by the manufacturer or the end user. The oxygen flow is then calculated as:

Flow O2=flux*Surface area

If the oxygen flow is not sufficient, a longer membrane can be used, or another membrane with higher flux rate of oxygen should be selected.

To generate micron size oxygen bubbles, however, larger surface area will be needed to minimize the coalescing of the oxygen bubbles to form bigger oxygen bubbles. Bubbles that emerge from the membrane wall can collide with additional other bubbles. Therefore, the amount of gas generated per unit surface area must be reduced to minimize bubble growth and bubble coalescence.

The targeted sweeping velocity of the liquid dictates the diameter of the membrane cylinder in order to generate micron size gas bubbles. The second important factor that dictates the formation of micron size bubbles is the superficial gas exit velocity. Although the targeted sweeping velocity indicates that the inertia force has exceed the hydrodynamic equilibrium of the adhesion force, the rate of gas exiting the pores can change the growth rate of the merging gas bubbles (like blowing a balloon), resulting in larger micron size gas bubbles. By regulating the superficial gas exit velocity for a given targeted sweeping gas velocity, therefore, the average micro-size bubbles can be tuned to any desired outcome.

In practice, the length of the porous membrane with a given porosity/flux and the gas flow rate can be adjusted to give any micron size bubbles as desired. To practice this invention, the superficial gas velocity crossing the membrane wall is calculated as:

$$V_s = \frac{F_g}{A_m}$$

Where $V_s$=Superficial gas velocity (ft/sec)
$F_g$=Actual gas flow rate (cu ft/sec, pressure compensated)
$A_m$=Total available area of the membrane wall (sq ft)

The superficial gas velocity should be less than 3.5 ft/sec, and preferably below 0.1 ft/sec to give the best results, with the proper sweep velocity calculated from the optimum Weber number.

The prior art of using sonic jet or high velocity gas jet for gas dissolution certainly teaches away from the approach necessary for the performance of the membrane-based oxygenation system of the present invention. This invention is preferably based on a Superficial Gas Exit Velocity at very low linear velocity to be used for this application, which will influence the required length of the membrane cylinder. The Superficial Gas Exit Velocity is defined as:

$$S_V = \frac{Q_L}{\pi \cdot D_i L_M}$$

Where
$S_V$=Superficial Gas Exit Velocity in m/sec
$Q_L$=Liquid flow rate, in m3/sec
$D_i$=Diameter of the membrane cylinder, in meter
$L_M$=Length of the membrane cylinder, in meter Although both the diameter and length of the membrane cylinder contribute to the surface area, only the length can be adjusted for the required Superficial Gas Exit Velocity. In this invention, the optimum Superficial Gas Exit Velocity should be between 0.1 ft/sec to 3.5 ft/sec.

The membrane used in this invention has limited porosity and therefore limited flux that gas can pass through, especially for a membrane with small pores less than 100 microns in diameter. Flux is defined as gas flow rate per unit surface area. To allow sufficient soluble gases to pass through, the membrane with small pores must have a very high fraction of pores of micron size so that the gas flux will remain high. The advantage of utilizing the entire 360 degrees of surface of wall 10 is so that a lot more surface area is available for gas flow into the liquid in flow passage 20. For a cylinder shaped wall 10 as in the illustration, the gas flow rate can be calculated as:

Gas Flow Rate=Flux$(3.1416*R^2)$*Length where R is the radius of the cylinder shaped wall 10. The radius or diameter of the membrane is dictated by the required liquid sweeping velocity so the option of increasing the cylinder diameter is limited. The cylindrical design of the membrane utilizing the entire circumference of 360 degrees can provide the maximum gas flow at the lowest exit velocity. Increasing the length of the wall 10 (parallel to the direction of the liquid flow) can also increase the gas flow at the same gas exit velocity. However, pressure drop will also increase with the travel distance of the liquid. Therefore, selecting the membrane with the higher flux remains the best option.

In operation according to this invention, liquid into which gas is to be fed is passed into device 1 through feed opening 3. The liquid passes into and through section 2 (if present), through inlet 13, then into and through flow passage 20, then into and through outlet 15, and through and out of section 6 (if present) and then out of opening 7. The gas or gas mixture that is to be passed into the liquid is passed through port 5 (or multiple ports 5 if present) into chamber 18. The gas enters into exterior face 12 of the membrane in wall 10. The gas emerges out of the membrane through discharge face 11 into flow passage 20, and contacts the liquid in flow passage 20. Water-soluble gas that was fed into chamber 18 and then into flow passage 20 as described herein forms bubbles in the liquid which are swept off of the membrane surface and into the liquid while the bubbles are still micron size. The water-soluble gas dissolves into the liquid as the liquid flows from the throat section into the lines downstream from the device 1.

In the preferred embodiments of this invention, the preferred liquid is water including fresh water or sea water, and the preferred gas is oxygen or a gaseous mixture having an oxygen content of at least 50 vol. % oxygen, more preferably at least 90 vol. % oxygen, e.g. for oxygenation of water. Other preferred gases are carbon dioxide, and gaseous mixtures having a carbon dioxide content of at least 90 vol. % carbon dioxide, e.g. for carbonation of beverages and process fluids.

The system and method of the present invention provide numerous advantages.

In particular, the pressure drop encountered across the device 1 from feed opening 3 to discharge opening 7 is significantly lower than is encountered in prior oxygenation devices. This means that less energy is consumed in the operation to dissolve a given amount of gas into a given amount of water.

Results show that total pressure loss when comparing the liquid pressure at the exit section verses the inlet section is less than 30% whereas pressure drops of less than 10% and even less than 1% can be realized by practice according to this invention. One would expect the pressure loss would be much higher as the liquid is accelerated in the throat section to higher velocity. Furthermore, the gas is injected into a flowing liquid, increasing the total volumetric flow. This is contributed by the fact that micron size gas bubbles can dissolve quickly, occupying less space. The greatest impact is the use of the membrane in the entire throat section. The micron size gas bubbles generated by the membrane covering the entire throat were able to serve as a lubricant to interrupt the frictional liquid flow at the throat section and allow the emerging micron size bubbles to be swept closer to the membrane surface.

In addition, a significant fraction of the bubbles of gas that form in flow passage 20 are very small, which means that a significantly greater amount of the gas becomes dissolved in the liquid rather than coalescing into larger bubbles which would reduce the rate and degree of gas dissolution in the liquid. Thus, the invention also provides a high degree of dissolution of the gas into the liquid.

EXAMPLE

The following non-limiting example illustrates the present invention.

As a case study, an oxygenator suitable to oxygenate the sea water in a 400 mm diameter pipe line was constructed. A device illustrated in FIGS. 1, 2, and 3 was constructed in which the inlet section, the throat section and the outlet section were circular in cross-section and concentric with a common centerline. The inlet section was conical in shape. The feed opening was 15.75 inches in diameter, the downstream end of the inlet section was 8.5 inches in diameter, and the inlet section height was 25.9 inches. The outlet section was conical in shape. The upstream end of the outlet section was 8.5 inches in diameter, and was 10.75 inches from the discharge opening, and the outlet section diverged at an angle of 8 degrees from the centerline of the outlet section. The throat section was 6 inches high and was attached at one end to the downstream end of the inlet section and at its other end to the upstream end of the outlet section. The membrane was centered in the throat section and had a diameter of 8.5 inches.

The membrane was constructed from Hastalloy C-22 for excellent corrosion resistance to seawater. The metallic membrane used in this case study had 98% of pores less 0.5 micron in diameter. The metallic membrane exhibited a very high flux of 40 scfm/ft$^2$ at 7 psi of $O_2$ differential pressure. This means that this metallic membrane had a very high number of very small pores through it, that is not achievable with surface with drilled holes or nozzles.

Liquid (sea water) was flowed through a 400 mm diameter pipe into the conical feed opening of the inlet section at a rate of 15 m$^3$/min which is equivalent to a liquid linear velocity of 2.3 2 m/sec. The conical inlet section increased the velocity of the liquid to 6.83 m/sec with a corresponding number N of 227 at the inlet face of the metallic membrane in the throat section. At this velocity of 6.83 m/sec or 3 times higher than the pumping velocity in the pipe, the pressure drop was expected to be significant especially with gas injection at these rates. Oxygen was injected into the metallic membrane at a rate of 12.5 kg/h. While from conventional expectations the accelerated liquid, especially with two-phase flow, the pressure drop was expected to further increase, it was surprisingly determined by computational fluid dynamic simulation and actual tests that the pressure drop was only 0.02 bar, much lower than typically expected for single phase flow or conventional two phase flow. Micron size oxygen bubbles were found to have been generated and were present in the liquid that emerged from the outlet face of the membrane. These micron size oxygen bubbles are due to the high sweeping liquid velocity, in combination with small pore sizes and high flux rate of the metallic membrane. Viscous drag was reduced at the boundary layer at the membrane surface covered with micron size bubble emerging from the micron size pores, and in conjunction with the diverging outlet section, very low total pressure drop across the entire oxygenation system was achieved.

What is claimed is:

1. A method for feeding a water-soluble gas into an aqueous liquid, comprising
   (a) feeding the aqueous liquid into the inlet section and out of the outlet section of a conduit that has an inlet, an outlet, and a throat section that defines a flow passage between the inlet and the outlet through which the liquid flows from the inlet to the outlet;
   wherein the conduit also has an inlet section, upstream of and sealed to the inlet, whose cross-sectional area converges in the direction toward the throat section, and the conduit has an outlet section, downstream of and sealed to the outlet, whose cross-sectional area diverges in the direction away from the throat section;
   wherein the inner surface of the throat section comprises a smooth microporous discharge face of a solid microporous membrane through which gas can pass from the interior of the membrane out of the membrane into the throat section, wherein the discharge face is comprised of pores at least 95% less than 200 microns in diameter;
   wherein the liquid is fed into the inlet at a flow rate such that the velocity $V_{SW}$ of the liquid at the discharge face of the membrane is determined by the equation $$V_{sw} = \sqrt{\frac{N \cdot \sigma}{\rho \cdot d}}$$

in which Vsw is the velocity of the liquid at the discharge face, N is a dimensionless number from 1 to 1,000, $\rho$ is the density of the liquid in Kg/m$^3$, $\sigma$ is the surface tension of the liquid in Newton/m, and d is 20 micron to 5,000 micron; and
   (b) feeding water-soluble gas into and through the membrane and out of the microporous discharge face of the membrane in the throat section into the liquid flowing through the throat section, at a gas pressure high enough to cause the gas to pass into and through the membrane into the liquid, wherein the gas that passes into the liquid forms bubbles at the membrane surface, the flowing liquid sweeps the bubbles off of the membrane surface, and the gas dissolves into the liquid.

2. A method according to claim 1 wherein N is 3 to 700.

3. A method according to claim 1 wherein N is 5 to 500.

4. A method according to claim 1 wherein d is 20 to 500 microns.

5. A method according to claim 1 wherein d is 20 to 100 microns.

6. A method according to claim 1 wherein the water-soluble gas is fed out of the discharge face of the membrane at a superficial velocity of 0.1 to 5 ft/sec.

7. A method according to claim 1 wherein all of the inner surface of the throat section is comprised of the microporous discharge face of the microporous membrane.

8. A method according to claim 1 wherein the pressure drop between where the liquid enters to the inlet section and where the liquid exits from the outlet section with gas injection is less than the pressure drop through the same length of a straight pipe without gas injection.

9. A method for feeding a water-soluble gas into an aqueous liquid, comprising
   (a) feeding the aqueous liquid into the inlet section and out of the outlet section of a conduit that has an inlet, an outlet, and a throat section that defines a flow passage between the inlet and the outlet through which the liquid flows from the inlet to the outlet;
   wherein the conduit also has an inlet section, upstream of and sealed to the inlet, whose cross-sectional area converges in the direction toward the throat section, and the conduit has an outlet section, downstream of and sealed to the outlet, whose cross-sectional area diverges in the direction away from the throat section;
   wherein the inner surface of the throat section comprises a smooth microporous discharge face of a solid microporous membrane through which gas can pass from the interior of the membrane out of the membrane into the throat section; and
   (b) feeding water-soluble gas into and through the membrane and out of the microporous discharge face of the membrane in the throat section into the liquid flowing through the throat section, at a gas pressure high enough to cause the gas to pass into and through the membrane into the liquid, wherein the gas that passes into the liquid forms bubbles at the membrane surface, the flowing liquid sweeps the bubbles off of the membrane surface, and the gas dissolves into the liquid; and
   (c) the pressure drop between where the liquid enters to the inlet section and where the liquid exits from the outlet section with gas injection is either (c)(1) less than the pressure drop through the same length of a straight pipe without gas injection, or (c)(2) less than the pressure drop through the same throat section without gas injection.

10. A method according to claim 9 wherein the water-soluble gas is fed out of the discharge face of the membrane at a superficial velocity of 0.1 to 5 ft/sec.

11. A method according to claim 9 wherein all of the inner surface of the throat section is comprised of the microporous discharge face of the microporous membrane.

* * * * *